Jan. 15, 1924.
A. O. AUSTIN
1,481,080
INSULATOR
Filed April 10, 1919
5 Sheets-Sheet 1
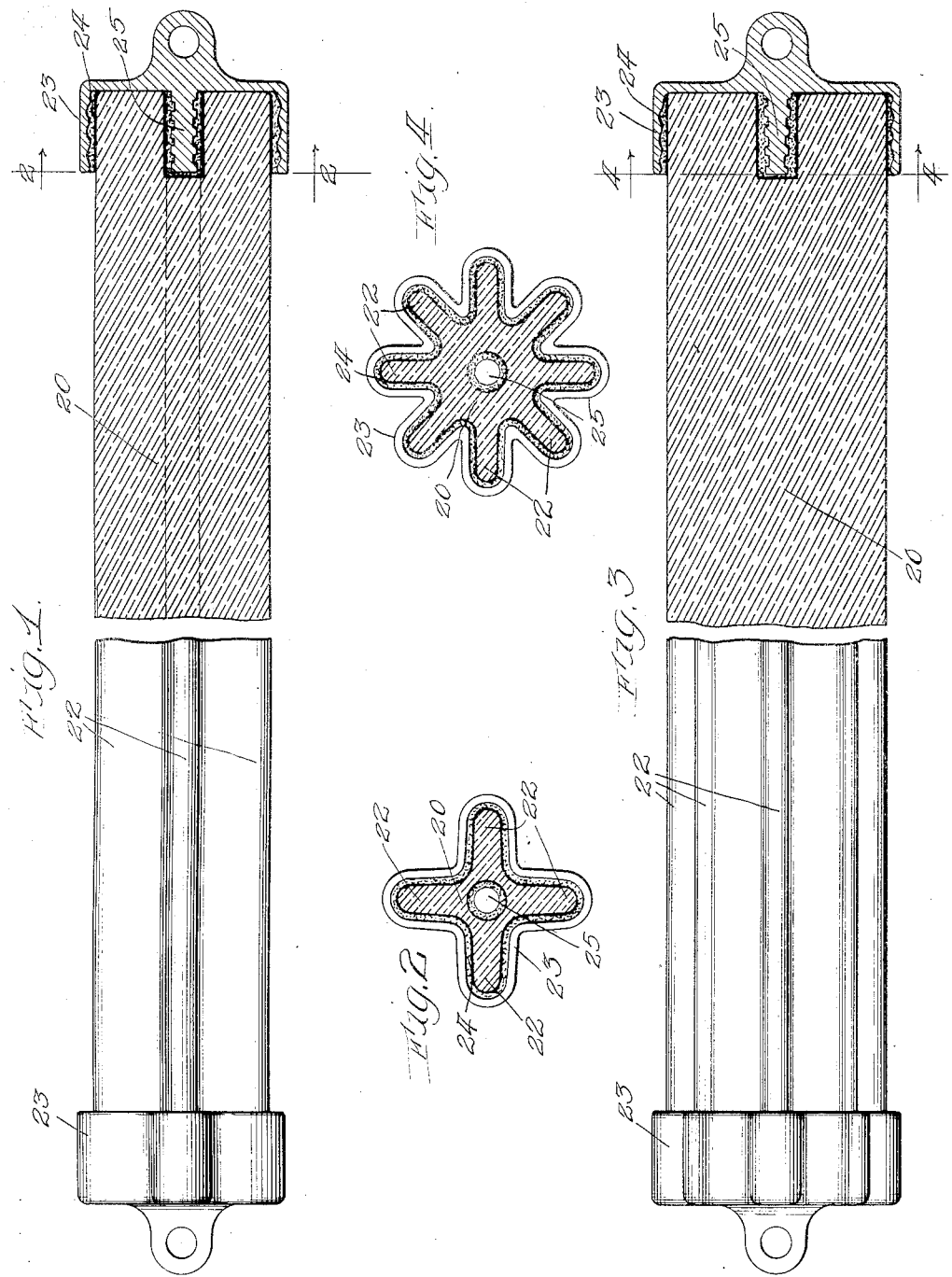

Jan. 15, 1924.
A. O. AUSTIN
INSULATOR
Filed April 10, 1919
1,481,080
5 Sheets-Sheet 2
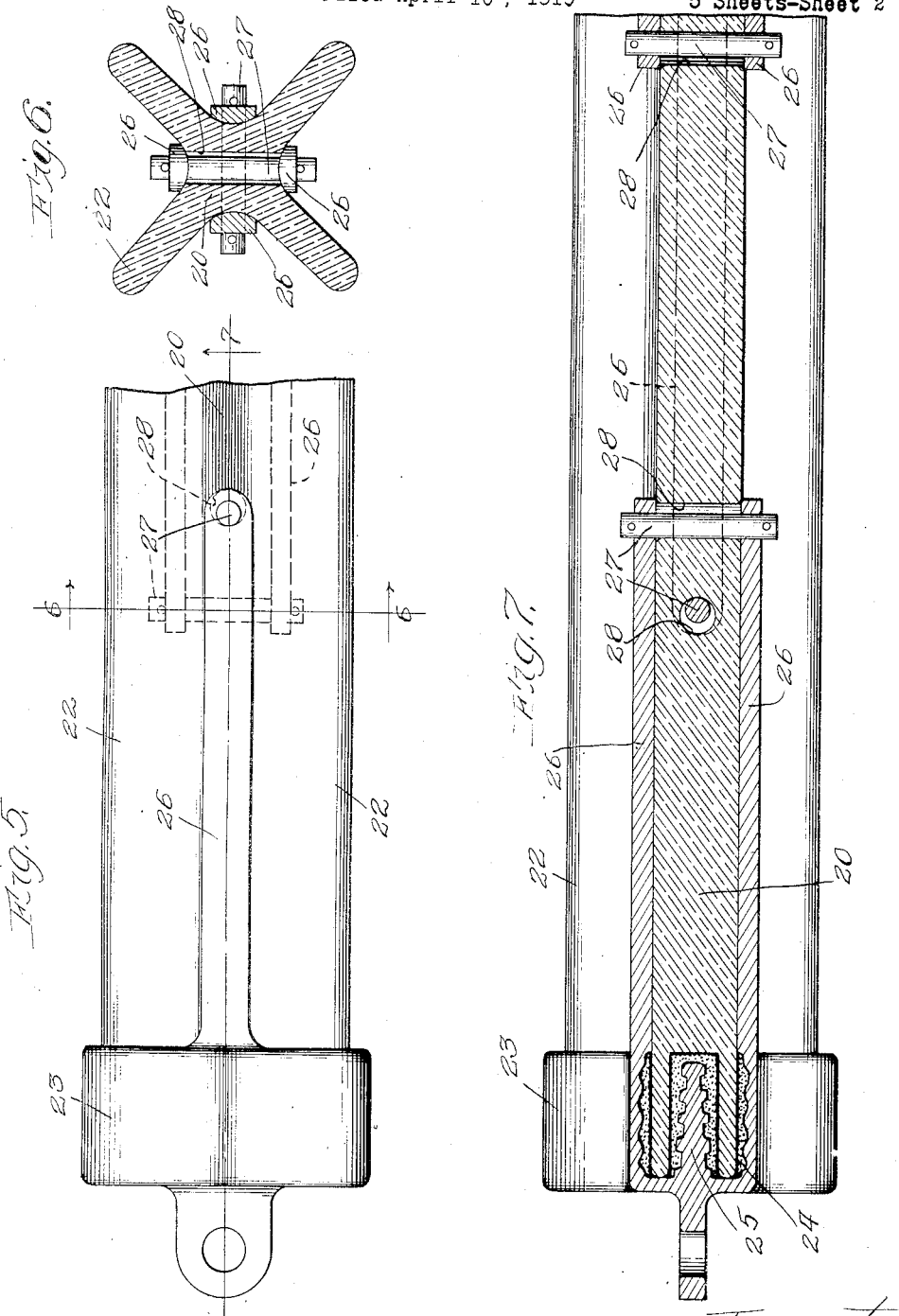

Jan. 15, 1924.
A. O. AUSTIN
1,481,080
INSULATOR
Filed April 10, 1919     5 Sheets-Sheet 3
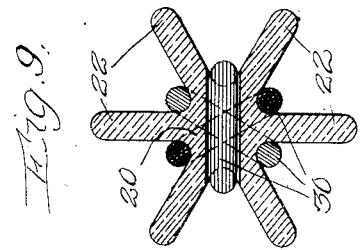
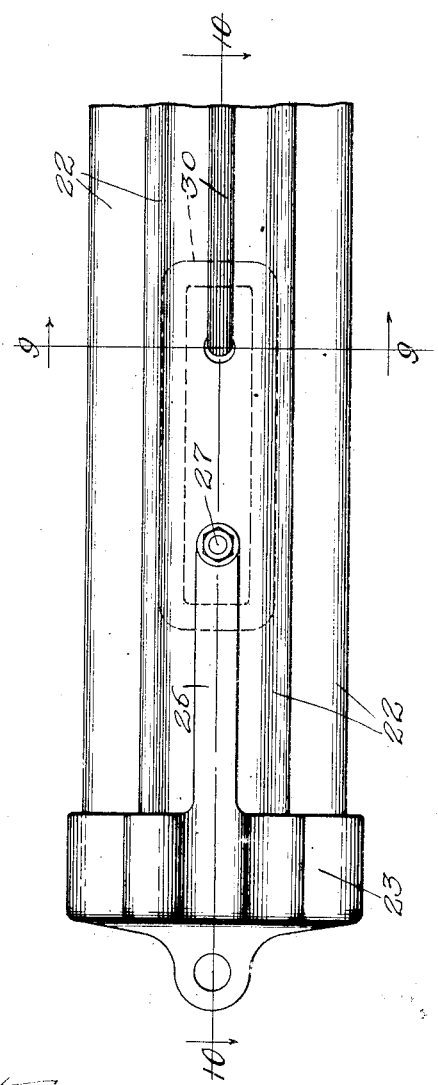
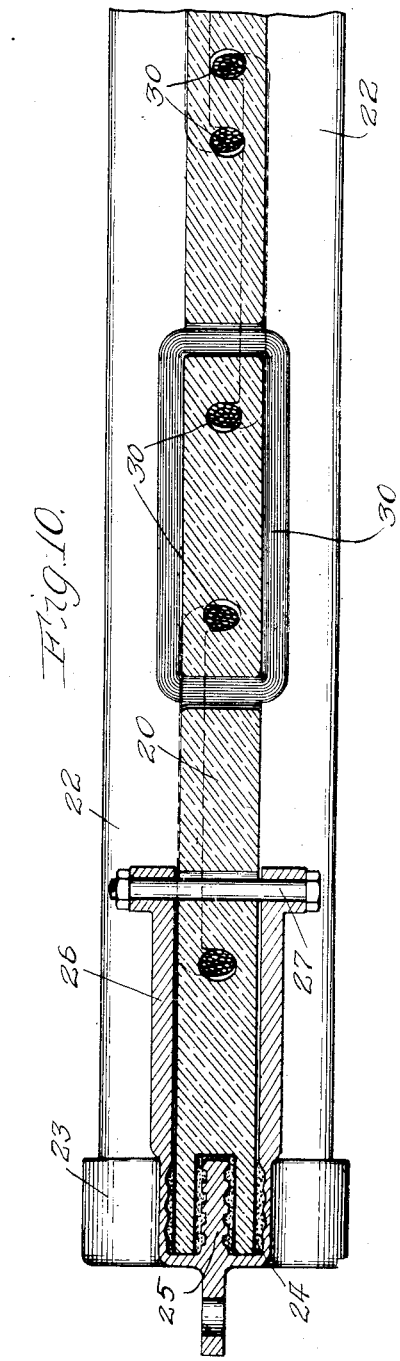

Jan. 15, 1924.
A. O. AUSTIN
1,481,080
INSULATOR
Filed April 10, 1919      5 Sheets-Sheet 4
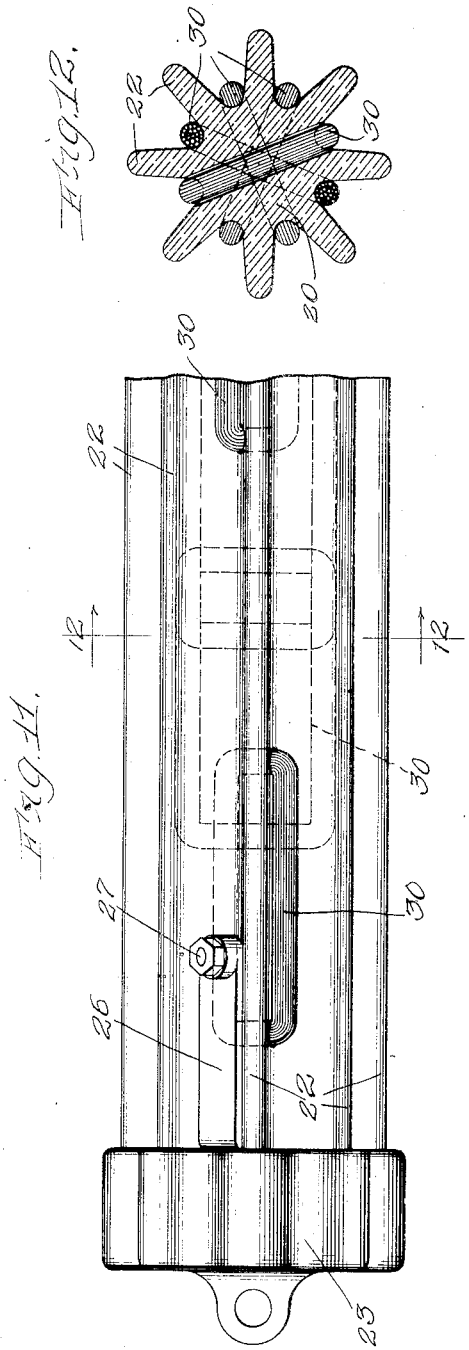
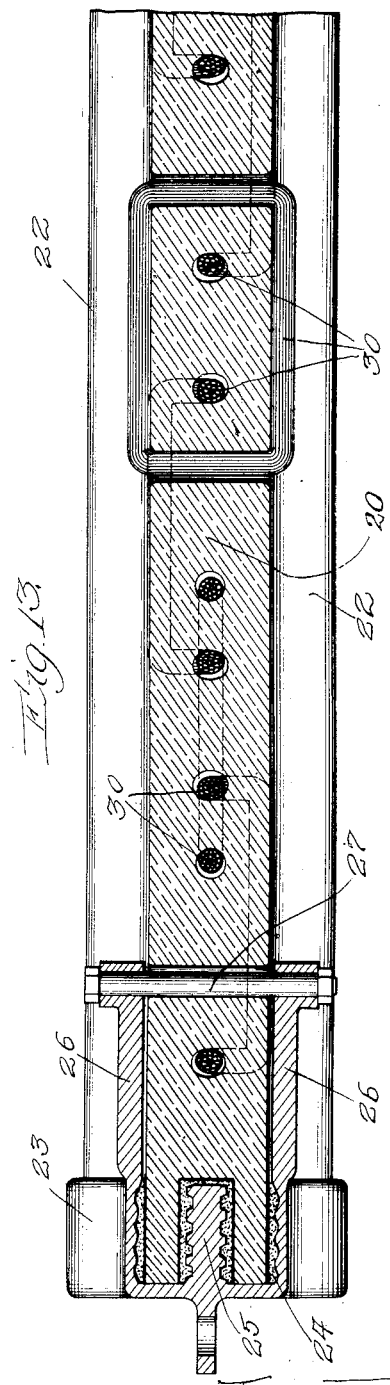

Jan. 15, 1924.
A. O. AUSTIN
INSULATOR
Filed April 10, 1919
1,481,080
5 Sheets-Sheet 5
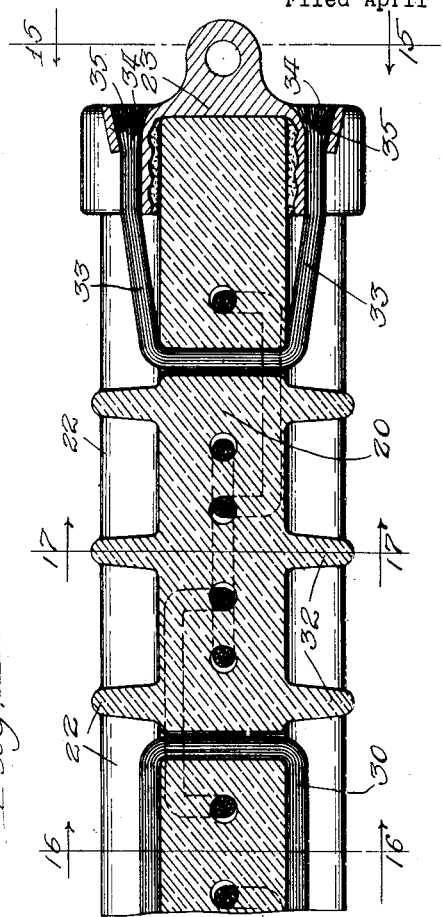
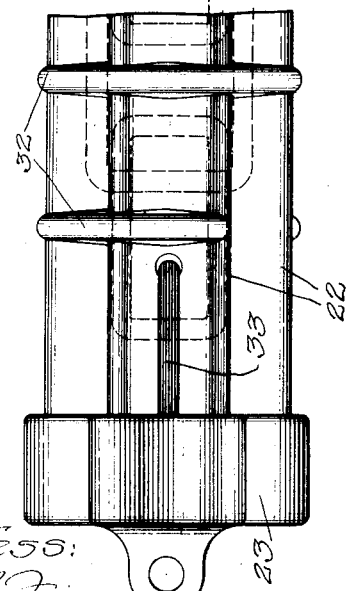
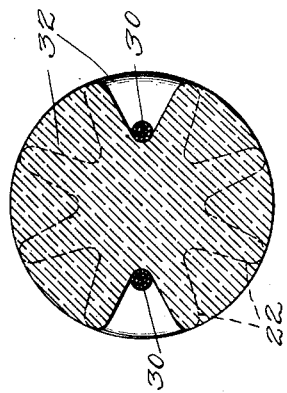
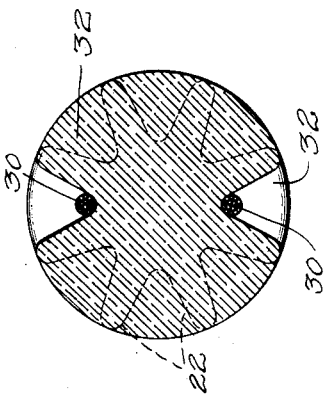
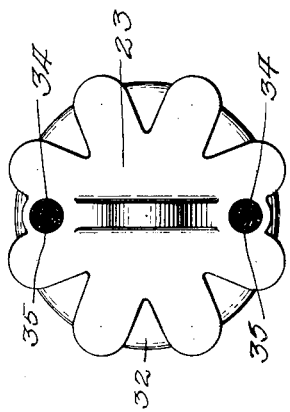
Inventor
Arthur O. Austin
By Brown & Nissen, Attys.

Patented Jan. 15, 1924.

1,481,080

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

INSULATOR.

Application filed April 10, 1919. Serial No. 289,090.

*To all whom it may concern:*

Be it known that I, ARTHUR O. AUSTIN, a citizen of the United States, residing at Barberton, in the county of Summit and State of Ohio, have invented certain new and useful Improvements in Insulators, of which the following is a specification.

The invention relates to insulators for electricity has for its object the provision of such insulators which shall be capable of withstanding mechanical stresses to which they are subject without impairing their electrical properties and which shall be of improved construction and operation.

The invention is exemplified in the combination and arrangement of parts shown in the accompanying drawings and described in the following specification, and it is more particularly pointed out in the appended claims.

In the drawings,

Fig. 1 is an elevation partly in section of an insulator embodying one form of the present invention;

Fig. 2 is a transverse section on line 2—2 of Fig. 1;

Fig. 3 is a view similar to Fig. 1 but showing a modified form of the invention;

Fig. 4 is a transverse section on line 4—4 of Fig. 3;

Fig. 5 is a fragmentary elevation of another form of the invention;

Fig. 6 is a transverse section on line 6—6 of Fig. 5;

Fig. 7 is a longitudinal section on line 7—7 of Fig. 5;

Fig. 8 is a view similar to Fig. 5, of another modification of the invention;

Fig. 9 is a transverse section on line 9—9 of Fig. 8;

Fig. 10 is a longitudinal section on line 10—10 of Fig. 8;

Fig. 11 is a view similar to Figs. 5 and 8 showing a further modification of the invention;

Fig. 12 is a transverse section on line 12—12 of Fig. 11;

Fig. 13 is a longitudinal section of the insulator shown in Fig. 11;

Fig. 14 is an elevation partly in section of an insulator showing a different modification of the invention;

Fig. 15 is an end view of the insulator shown in Fig. 14;

Fig. 16 is a transverse section on line 16—16 of Fig. 14;

Fig. 17 is a transverse section on line 17—17 of Fig. 14.

The materials now most commonly used for the construction of insulators, which are subjected to high tension such as insulators for the support of high tension power transmission lines and for the support of antennæ in wireless work, are generally of a comparatively fragile nature such as porcelain, and since, as the breaking of an insulator of this class may result seriously, it is important that such insulators should be of sufficient size and proportion to withstand the stresses to which they are subjected. It is also desirable that such insulators should be as light as possible so that their supports will not be subjected to undue weight. If the only stresses to which the insulators are subjected were those due to direct pull of the load upon the insulator, it would be comparatively immaterial what the cross sectional shape of an insulator was. In practice, however, such insulators are subjected to other stresses besides the direct pull of the load, the most serious of which probably are those set up by vibration. It will readily be understood that vibration of an insulator subjects the insulator to stresses which are the same as those of a beam in flexure. Insulators constructed according to the present invention are designed to withstand not only longitudinal stresses, but stresses set up by vibration, and to do so with the smallest amount of material possible, so as to keep down the weight of the insulator.

In Fig. 1, the numeral 20 designates a bar of insulating material, such as porcelain, which is provided with longitudinally extending ribs or flanges 22 extending radially from the central core portion of the bar and spaced peripherally about the bar. The ends of the insulator are provided with metallic caps 23 which are connected, respectively, with the support and the load and these caps are secured to the bar 20 by cement 24 applied in a manner well known in the art. The end of the insulator may be centrally bored to receive a pin 25 projecting from the end cap 23, the pin being cemented within the opening in the insulator to aid in holding the cap in place. It will be seen that this insulator provides a sectional shape well designed to withstand flexure caused by vibration and to develop therefore a high ultimate strength under working conditions. The ribbed construction permits of a large cross-section with high moment of inertia without the disadvantage of central openings like that of a tube which may lead to internal discharge. The ribbed section also lends itself readily to the interlinked structural or reinforcing members described.

In the form of the invention shown in Figs. 3 and 4, the insulator is slightly modified by the addition of a large number of ribs 22, there being eight ribs in the form shown in these figures. It will be understood, of course, that the number of ribs may be varied without departing from the spirit of the invention.

In Figs. 5, 6 and 7 there is shown an insulator similar to that of Fig. 1, with the addition of reenforcing members 26 which lie in the grooves between the ribs 22 and which are arranged so that the ends of successive reenforcing members overlap and are spaced peripherally from one another by intervening ribs 22. The members 26 are arranged in pairs in diagonally opposite grooves and the ends of each pair are connected by cross pins 27 extending through openings 28 which penetrate the central portion of the insulator. It will be seen that the reenforcing members 26, together with their pins 27, form a chain the links of which interlock with one another but are insulated from one another by the material of the insulating bar. The reenforcing members 26 may be made to carry a portion or all of the load supported by the insulator, in which case the insulating material between pins 27 of adjacent links will be in compression. The links, however, cannot overcome the stresses set up by flexure and therefore the structural shape of the insulator bar is desirable for resisting these stresses. In some instances it may be desirable to permit the pins 27 to fit loosely in the perforations 28, so that the insulator bar 20 will carry the entire load and the members 26 and pins 27 will act only as a mechanical support for the load, in case the insulator is broken, to prevent the load from falling from its supporting structure. The end caps 23 are provided in this type of insulator, the same as in those previously described, and the members 26 at the ends of the insulator may be formed integrally with these end caps, as shown in the drawings, or connected with them in any other desired manner.

Figs. 8 to 10, inclusive, show an insulator similar to that shown in Fig. 5, but provided with a larger number of ribs or fins 22. Where more than four ribs are present, it is desirable that each successive link is spaced angularly about the insulator in the groove next adjacent the preceding link. It will be apparent that this arrangement will leave the longest space possible between any two adjacent links in a single groove, thus providing the longest path of discharge between links in case of a flash-over. It will also be apparent, that this distance between adjacent links in a single groove will increase with the number of fins formed on the insulator, so that a large number of fins increases not only the mechanical efficiency of the insulator, but also the insulating efficiency against flash-over. In Figs. 8 to 10, inclusive, integral links 30 of wire cable are shown in the place of the built-up links, such as those illustrated in the previous figures.

Figs. 11 to 13, inclusive, illustrate a form of insulator similar to that shown in Figs. 8 to 10, inclusive, but eight ribs instead of six ribs are illustrated in Figs. 11 to 13, inclusive. These latter figures clearly illustrate the effect of a greater number of ribs and show the increased distance between adjacent links in a single groove.

In the form of the invention shown in Figs. 14 to 17, inclusive, cross baffles 32 are formed transversely of the grooves between the ribs 22, for the purpose of preventing flash-over between adjacent links in any one of the grooves. The connection of the end link 33 is also somewhat different from that of the previous links, the end link in this case being formed of a wire cable having the strands separated, as shown at 34, and filled with metal in a well known manner to secure them in sockets 35 formed integrally with the end caps 23.

I claim:

1. An elongated insulator having externally arranged interlinking reenforcing members connected therewith and insulated from one another, each of said members being insulated from one of the attaching portions of said insulator.

2. An elongated insulator having externally arranged interlinking reenforcing members connected therewith, said members being arranged to penetrate said insulator in spaced relation to one another so that adjacent portions of said members are insulated from one another by intervening portions of said insulator.

3. An insulator comprising an elongated bar having longitudinally extending ribs projecting radially therefrom, and reenforcing members connected with said bar and positioned in the grooves between said ribs.

4. An elongated insulator having reenforcing members connected therewith and arranged externally of said insulator at different angular positions thereon, and projections on said insulator for separating said angularly spaced reenforcing members from one another.

5. In combination, an insulator comprising an elongated bar having longitudinally extending and peripherally spaced ribs thereon, and interlinking reenforcing members connected with said bar and angularly spaced relatively to one another thereon so that said members are separated from one another by said ribs.

6. An insulator comprising an elongated bar having a plurality of peripherally spaced longitudinally extending ribs thereon, interlinking reenforcing members connected with said bar and positioned in the grooves between said ribs, said reenforcing members being arranged in said grooves so that each member is separated from the next adjacent member by one of said longitudinally extending ribs.

7. An insulator comprising an elongated bar having peripherally spaced longitudinally extending ribs thereon, and a plurality of reinforcing links connected with said bar and having the ends thereof arranged to pass through said bar in spaced relation to one another so as to interlink with one another and so that the adjacent ends of successive links will be insulated from one another by the material of said bar.

8. An insulator comprising an elongated bar having peripherally spaced longitudinally extending ribs thereon supporting members connected with the ends of said bar, and a plurality of reinforcing links connected with said bar and having the ends thereof arranged to pass through said bar in spaced relation to one another so as to interlink with one another and so that the adjacent ends of successive links will be insulated from one another by the material of said bar, the side portions of said links being arranged to lie between said ribs and to be spaced peripherally from one another by said ribs.

9. An insulator comprising an elongated bar having peripherally spaced longitudinally extending ribs thereon, and a series of links connected with said bar and having the ends thereof arranged to pass through said bar in spaced relation to one another so as to interlink with one another and so that the adjacent ends of successive links will be insulated from one another by the material of said bar, the side portions of said links being arranged to lie in the grooves between said ribs, said links being arranged angularly relative to one another so that each successive link will be spaced angularly from the next preceding link by a single rib of said insulator, the angular direction in which each link is spaced from the preceding link being the same progressively in a longitudinal direction along said bar.

10. In combination, an insulator comprising an elongated bar having longitudinally extending ribs thereon, spaced reenforcing members arranged in a groove between said ribs, and a baffle of insulating material between said reinforcing members.

11. An insulator comprising an elongated bar having longitudinally extending ribs thereon, interlinking reenforcing members connected with said bar and arranged in the grooves between said ribs, and transverse baffles of insulating material arranged to separate the reenforcing members in said grooves.

12. An insulator comprising an elongated bar having longitudinally extending ribs projecting radially therefrom and extending along the longitudinally central portion of said bar for reinforcing said bar against bending strains, and reinforcing members connected with said bar and positioned in the grooves between said ribs.

13. An elongated insulator having reinforcing members connected therewith and arranged externally of said insulator at different angular positions thereon, and projections on said insulator extending the full length of said reinforcing members for separating said angularly spaced reinforcing members from one another.

14. In combination, an insulator comprising an elongated bar having longitudinally extending and peripherally spaced ribs thereon, interlinking reinforcing members connected with said bar and angularly spaced relative to one another thereon so that said members are separated from one another by said ribs, and attaching members for said insulator secured to the ends of said bar, each of said reinforcing members being separated from one of said attaching members by a portion of the insulating material of said bar.

15. An insulator comprising an elongated bar having a plurality of peripherally spaced ribs thereon extending substantially the full length thereof, and interlinking reinforcing members connected with said bar and positioned in the grooves between said ribs, there being a rib interposed between each of said reinforcing members and the reinforcing member next adjacent thereto.

16. An insulator comprising an elongated bar of dielectric material having radially projecting longitudinally extending ribs thereon, externally arranged interlinking reinforcing members disposed in the spaces between said ribs and insulated from one another, the reinforcing members adjacent the ends of said bar extending through openings in said bar to provide insulation between said reinforcing members and the ends of said bar, supporting members attached to the ends of said bar, and means connected with said supporting members and interlinked with said reinforcing members but insulated therefrom.

17. An insulator comprising an elongated bar having externally arranged interlinking reinforcing members connected therewith, said members being arranged to penetrate said insulator in spaced relation to one another so that adjacent portions of said members are insulated from one another by intervening portions of said insulator, and supporting members secured to the ends of said bar, said reinforcing members being arranged with insulating material interposed between said reinforcing members and the ends of said bar.

18. An insulator comprising an elongated bar having longitudinally extending ribs projecting radially therefrom, reinforcing members connected with said bar and positioned in the grooves between said ribs, said reinforcing members being spaced from the ends of said bar, supporting members connected with the ends of said bar, and connecting means secured to said supporting members and interlinking with said reinforcing members but insulated therefrom by the material of said bar.

19. An insulator comprising a unitary elongated bar of dielectric material having radially projecting longitudinally extending ribs thereon for strengthening said bar against bending moments, said bar having longitudinally spaced openings extending therethrough at different angles, reinforcing links arranged in said openings and in the grooves between said ribs, said links being insulated from one another by the material of said bar but interlinked to form a chain, supporting members connected to the ends of said bar, and connectors secured to said supporting members and interlinked with said chain but insulated therefrom by the material of said bar.

In testimony whereof I have signed my name to this specification on this 3rd day of April, A. D. 1919.

ARTHUR O. AUSTIN.